(No Model.)

J. C. KERNS.
ANIMAL TRAP.

No. 432,139. Patented July 15, 1890.

Witnesses
Harry L. Amer.
H. F. Riley

Inventor
James Calvin Kerns,
By his Attorneys
C. A. Snow & Co.

UNITED STATES PATENT OFFICE.

JAMES CALVIN KERNS, OF BUFFALO, MISSOURI.

ANIMAL-TRAP.

SPECIFICATION forming part of Letters Patent No. 432,139, dated July 15, 1890.

Application filed March 11, 1890. Serial No. 343,486. (No model.)

*To all whom it may concern:*

Be it known that I, JAMES CALVIN KERNS, a citizen of the United States, residing at Buffalo, in the county of Dallas and State of Missouri, have invented a new and useful Animal-Trap, of which the following is a specification.

The invention relates to improvements in animal-traps.

The object of the present invention is to provide a simple, inexpensive, and durable trap adapted for large and small animals and capable of killing its victim and preventing the latter warning others.

The invention consists in the construction and novel combination and arrangement of parts hereinafter fully described, illustrated in the accompanying drawings, and pointed out in the claim hereto appended.

Figure 1:
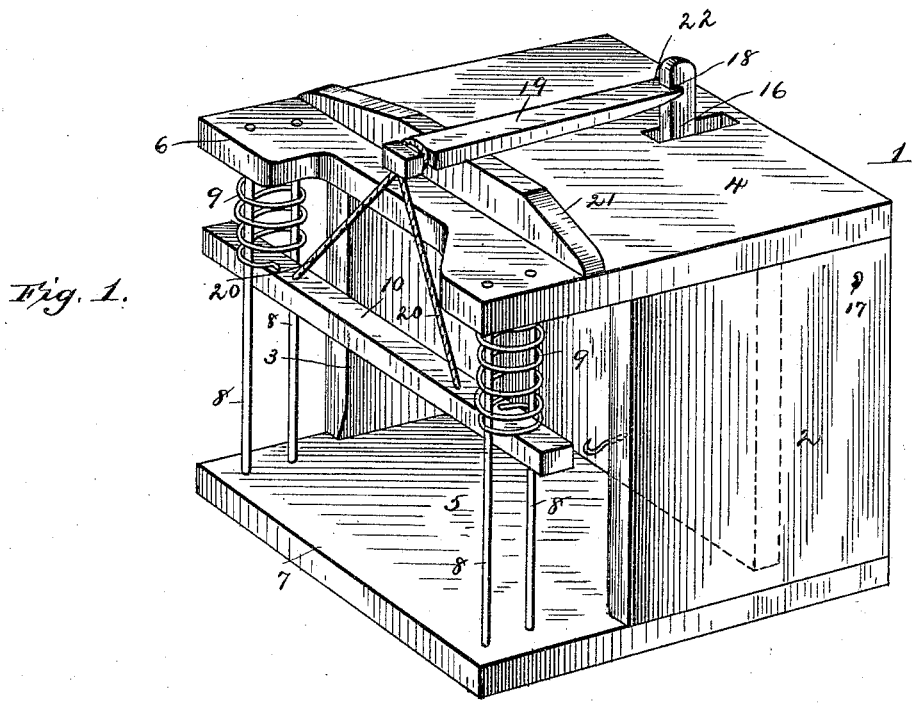
Figure 2:
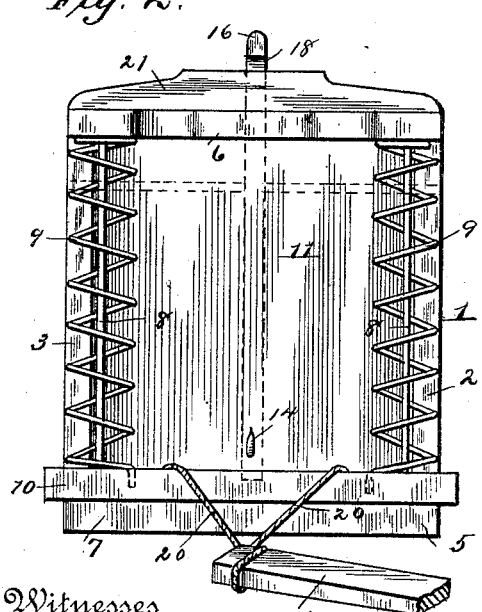
Figure 3:
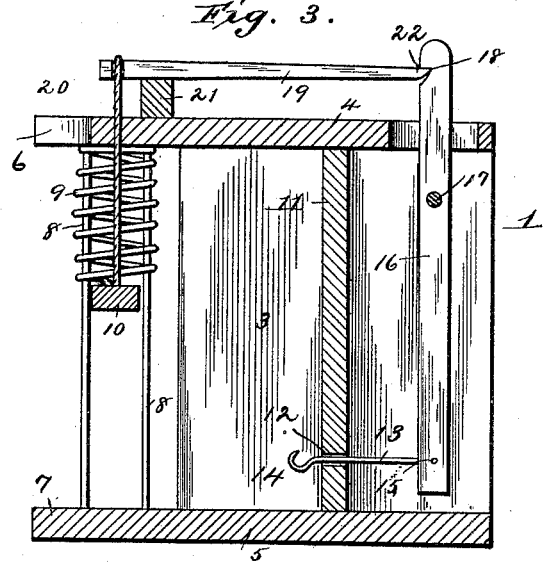

In the drawings, Figure 1 is a perspective view of a trap constructed in accordance with this invention and being shown set. Fig. 2 is a front elevation. Fig. 3 is a vertical sectional view.

Referring to the accompanying drawings, 1 designates the frame or box of a trap, which consists of sides 2 and 3, top 4, and bottom 5, the bottom and top projecting beyond the sides 2 and 3 at the front of the trap. The projecting portions 6 and 7 of the top and bottom have secured between them pairs of rods 8, that are arranged at each side of the trap, and have coiled around them heavy spiral springs 9, that are interposed between a follower 10 and the top 4, and have their lower ends secured to the former, and the said follower is adapted to be raised and the springs compressed when the trap is set, and when the trap is sprung the spiral springs 9 force the follower downward upon the back of the animal with sufficient force to kill it instantly. The strength of the springs is varied with the kind of trap, some animals requiring greater force than others; and I desire it to be understood that I do not limit myself to the precise details of construction herein shown and described, as I may, without departing from the spirit of the invention, make minor changes therein.

The frame or box 1 is provided with a partition 11, that has a perforation 12 near its lower edge, through which extends a trigger 13, that is provided with a hook 14 to receive a bait, and has its rear end 15 secured to a lever 16, that is fulcrumed on a horizontal rod 17, extending across the rear upper edge of the frame and secured in the sides thereof. The top 4 of the frame is provided with a recess, in which the upper end of the lever 16 works, and the said lever 16 has its upper end provided with a notch 18, that is adapted to be engaged by an end of a bar 19, the other end of which is connected to the follower by cords 20 or the like. The top 4 of the frame of the trap is provided with a cleat 21, and in setting the trap the bar 19 is fulcrumed on the cleat and drawn to a horizontal position, which raises the follower, and the latter is maintained in its elevated position, ready to be sprung, by engaging the pointed end 22 of the bar 19 with the notch 18 of the lever 16, and when the trigger 13 is pulled or in anywise moved by an animal that may be attracted by the bait the bar will be instantly released, and the follower will descend upon the back or neck of the animal, killing it instantly.

It will readily be seen that the trap is exceedingly sensitive and is readily sprung, and is capable of killing its victim and preventing the latter warning others of its fate. The traps may vary in size and be constructed to catch mice and rats or larger animals.

From the foregoing description and the accompanying drawings the construction, operation, and advantages of the invention will be readily understood.

Having thus described the invention, what I claim is—

In an animal-trap, the combination of the frame comprising the sides 2 and 3, the top and bottom projecting beyond the sides at the front of the frame, and the vertical partition bisecting the sides, the vertical guide-bars 8, arranged in pairs and having their ends secured to the extended portions of the top and bottom, the vertically-movable follower arranged between the bars 8, the springs encircling the bars 8 and interposed between the top and the follower, the horizontal bar 17, extending across the frame in the rear of the partition, the vertical lever fulcrumed on the bar 17 and provided at its lower end with a trigger extending through the partition and having its upper end extending through the frame, the cleat 21, and the cross-bar adapted to be arranged upon the seat and having one end flexibly connected with the follower and the other end arranged to be engaged by the lever, substantially as described.

In testimony that I claim the foregoing as my own I have hereto affixed my signature in presence of two witnesses.

JAMES CALVIN KERNS.

Witnesses:
FRANK FURTH,
JOHN J. WOLFE.